United States Patent [19]

Kaizaki

[11] Patent Number: 4,769,706
[45] Date of Patent: Sep. 6, 1988

[54] DIGITAL BLANKING REPRODUCING CIRCUIT

[75] Inventor: Kazuhiro Kaizaki, Yokohama, Japan

[73] Assignee: Hitachi, Ltd., Tokyo, Japan

[21] Appl. No.: 84,130

[22] Filed: Aug. 12, 1987

[30] Foreign Application Priority Data

Sep. 1, 1986 [JP] Japan ................................ 61-203773

[51] Int. Cl.$^4$ ............................................. H04N 5/14
[52] U.S. Cl. ................................ 358/160; 358/21 R; 358/166
[58] Field of Search ..................... 358/160, 166, 21 R, 358/37, 167, 36, 33

[56] References Cited

U.S. PATENT DOCUMENTS

| 3,953,668 | 4/1976 | Judice | 358/160 |
| 3,987,243 | 10/1976 | Schwartz | 358/160 |
| 4,240,112 | 12/1980 | Inada | 358/21 R |
| 4,600,937 | 7/1986 | Kudo | 358/21 R |
| 4,663,666 | 5/1987 | Bloom | 358/166 |

FOREIGN PATENT DOCUMENTS 89449 7/1977 Japan.

Primary Examiner—Tommy P. Chin
Attorney, Agent, or Firm—Antonelli, Terry & Wands

[57] ABSTRACT

A digital blanking reproducing circuit wherein video signals are converted into N (N: positive integer) bit digital signals and then signal-processed. On the basis of plural N bit signals during the blanking interval of the video signal, an M (M: positive integer, M>N) bit average signal and a plurality of N bit approximation data in the neighborhood of the average value signal are produced. The plurality of N bit approximation data are time-divisionally output in a time-division ratio decided in accordance with the lower order (M - N) bit data of the average signal. Thus, the signal processing of the N bit signals provides the accuracy equivalent to that of M (M>N) bit signals.

4 Claims, 4 Drawing Sheets

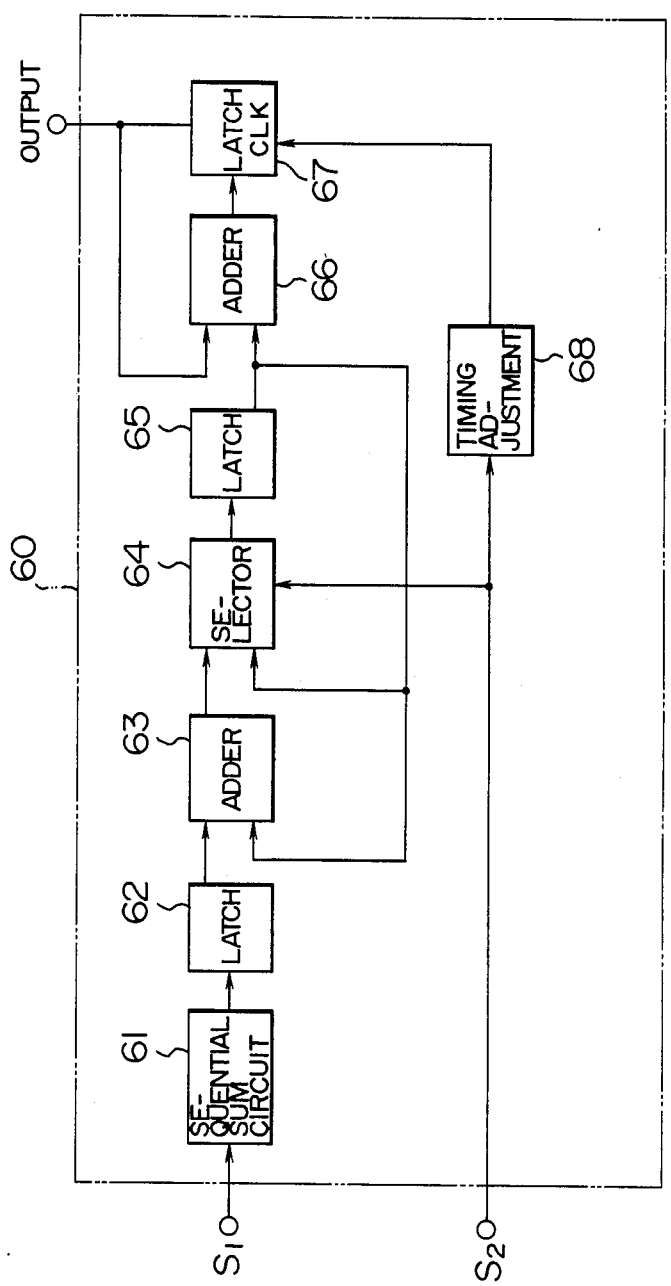
F I G. 4

DIGITAL BLANKING REPRODUCING CIRCUIT

BACKGROUND OF THE INVENTION

This invention relates to a blanking reproducing circuit for use in a digital television receiver and more particularly to a digital blanking reproducing circuit that is suitable to digitally process information during a blanking interval without storing it in a memory.

Such a digital blanking reproducing circuit is disclosed in JP-A-52-894,499. In this circuit to which video signals converted into digital signals and predetermined digital signals representative of black levels are supplied, the video signals are controlled in such a way that the voltage level of the video signals during the blanking intervals coincides with that of the predetermined digital signals. Since this control is carried out through the comparison between digital values of both signals mentioned above, the coincidence accuracy will be limited to $\frac{1}{2}$ of the quantization level. That is, no consideration has been made about further improvement of the accuracy of reproducing the D.C. components of the video signals during the blanking intervals.

SUMMARY OF THE INVENTION

An object of this invention is to provide a digital signal processing circuit which, in reproducing the D.C. component of video signals during their blanking interval, is capable of making the accuracy of signal processing higher than the digital quantization level.

In order to attain this object, in accordance with this invention, there is provided a digital signal processing circuit comprising first means for deriving video signals during their blanking interval as N bit digital signals, means for averaging the digital signals during the blanking interval derived by the first means to produce them as M bit (M>N) digital signals, means for time, divisionally producing plural N bit signals in approximation to the averaged digital M bit signals, and means for setting the division ratio of the time division of the plural N bit signals by the lower order M-N bit signals of the averaged signals, whereby the D.C. level can be implemented at the accuracy less than the quantization level by smoothing the plural N bit digital signals after they are D/A converted.

BRIEF DESCRIPTION OF THE DRAWINGS

FIG. 4 is a block diagram of the digital signal processing system in accordance with still another embodiment of this invention.

DESCRIPTION OF THE PREFERRED EMBODIMENTS

Figure 1:
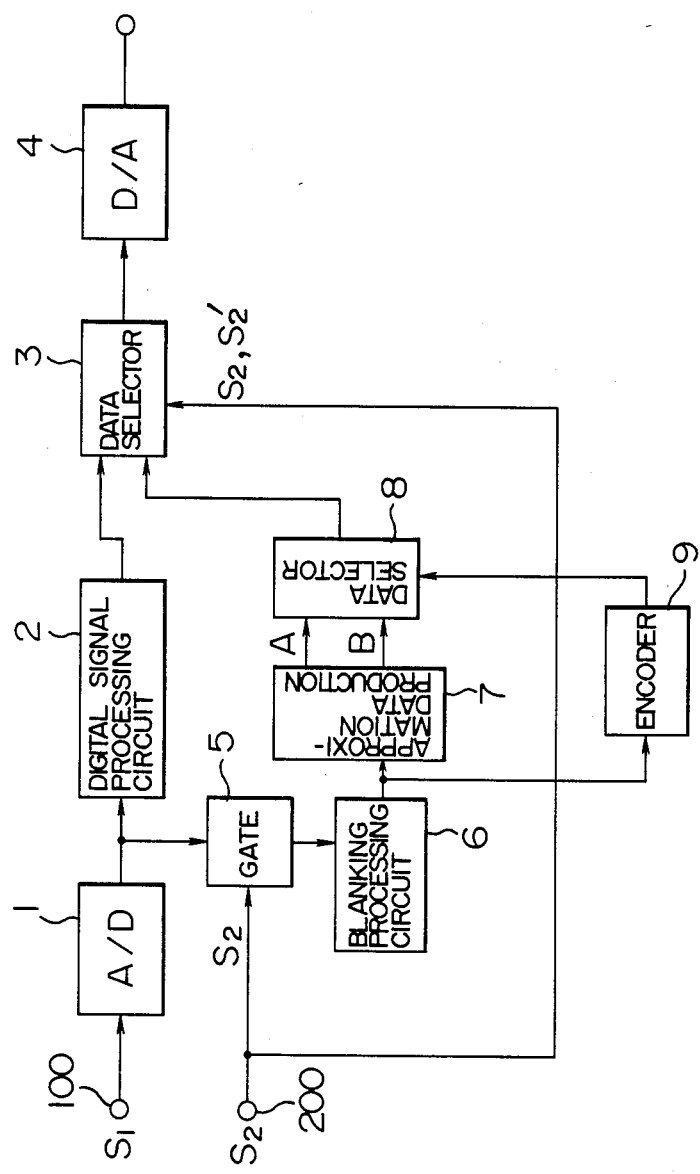
FIG. 1 is a block diagram of the digital signal processing system in accordance with one embodiment of this invention.

One embodiment of this invention will be explained with reference to FIGS. 1 and 2. In FIG. 1, a video signal supplied to an input terminal 100 is converted into an N bit digital signal by an A/D converter 1. This N bit digital signal is supplied to a digital signal processing circuit 2 and a gate circuit 5. The output from the digital signal processing circuit 2 is supplied to a data selector 3.

A blanking plus supplied to another input terminal 200, which represents the blanking interval of the video signal, is applied to the gate circuit 5 and the gate selector 3. The gate circuit 5 supplies the N bit digital signal to a blanking signal processing circuit 6, which serves as an averaging circuit, during the blanking interval of the video signal. The blanking signal processing circuit 6, when $2^n$ (n is an integer of 2 or more.) N bit digital signals are supplied there, an M (M>N) bit average value signal including (M-N) bits below the dicimal point. This M bit average signal is supplied to an approximation data producing circuit 7. Two N bit approximation data A and B approximated by rounding up and down the average value are produced there and then supplied to a data selector 8.

The data selector 8 time-divisionally supplies the approximation data A and B to the data selector 3 on the basis of the signal supplied from an encoder 9. The encoder 9 decides the time division ratio of the approximation data A and B on the basis of the lower order (M-N) bit signal of the M bit average signal and supplies the signal representative of the division ratio to the data selector 8. The two kinds of N bit approximation data are time-divisionally outputted from the data selector 8 so that the signal obtained by smoothing them will have the accuracy corresponding to M bits. The data selector 3 switches and outputs the digital video signal and the two kinds of time-division digital signals in accordance with the blanking pulse supplied. The output from the data selector 3 is converted into an analog signal by a D/A converter 4. The time-division digital signals which are averaged by a time-constant circuit in the subsequent D.C. reproducing circuit provide the D.C. voltage corresponding to M bits.

Meanwhile, an ordinary averaging circuit outputs 8 bit average value in response to 8 bit inputs. Therefore, the lower order 2 bits below the decimal point of the average value are rounded up or down and do not output, but only the higher order 8 bits are output. For example, when the average value is "01111111.11", "10000000" (round-up) or "01111111" (round-down) are output. Thus, when those values are converted into analog values, the former is output as "300" and the latter is output as "290". Therefore, the lower order two digit fraction of the actual average value "297.5" is not represented.

In this way, in the ordinary digital averaging circuit, the information corresponding to the lower order 2 bits is lost so that the averaging cannot be performed at a higher accuracy. The accuracy will be fully decided by the quantization level.

To obviate such a drawback of the ordinary averaging circuit, the following sum circuit is used as an averaging circuit in the blanking signal processing circuit 6.

The sum circuit takes the sum of four input signals or data which are supplied with a certain delay time, respectively and produces the signal representative of the sum each when the sum is taken. Since each of the input data is 8 bits, the sum of such four data results in the 10 bit data since two bits are added. The sum circuit outputs this 10 bit data as it is. The lower order two bits of the 10 bit output are fed to the encoder 9. The higher order 8 bit data except the lower order 2 bits is supplied to the approximation data generating circuit 7. The circuit 7 supplies this 8 bit data to the data selector 8 as a signal A and also supplies there the signal of this 8 bit data plus "1", which is added by an adder provided in the circuit 7, as a signal B.

More specifically, when the output from the sum circuit 6 is the sum "0111111111", the lower order two 2 bits "11" is sent to the encoder 9, while the higher order 8 bits is sent to the data selector 8 as the unchanged signal A and also the 1-plus signal thereof B, i.e., "10000000". In terms of the analog value, "290" is sent to the data selector 8 as the signal A while "300" is sent there as the signal B.

In accordance with the values of the lower order two bits sent, the encoder 9 produces signals with different duty ratios between the "H" level and the "L" level. Correspondingly, as shown in FIG. 2 the data selector 8 selectively outputs the signal A when the signal from the encoder 9 is at "L" level, and outputs the signal B when it is at "H" level.

Figure 2:
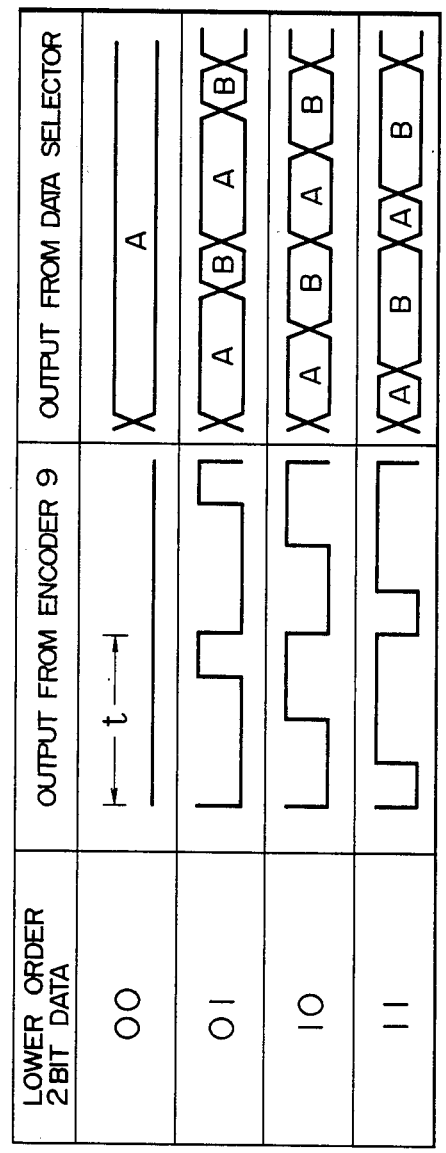
FIG. 2 is a view for explaining the operation of the encoder and the data selector shown in FIG. 1.

FIG. 2 is a view for explaining the operations of the encoder 9 and the data selector 8 shown in FIG. 1. As shown in FIG. 2, when the lower order two bit data is "00", the encoder 9 continues to output the "L" level signal throughout a certain period t, and when it is "01", "10", and "11", the encoder 9 outputs the "H" level during $\frac{1}{4}$, $\frac{1}{2}$, $\frac{3}{4}$ of the certain period t, respectively.

Therefore, for example, when the lower two bit data of "11" is supplied to the encoder 9, the encoder 9 outputs the "H" level signal during $\frac{1}{4}$ of the certain period. Correspondingly, as shown in FIG. 2 the data selector 8 outputs the signal A, i.e. "290" in terms of the analog value during $\frac{1}{4}$ of the certain period t and outputs the signal B, i.e., "300" during the remaining $\frac{3}{4}$ of the certain period t. Thus, the time average value of the output of the data selector 8 is calculated as $$(290 \times \tfrac{1}{4}) + (300 \times \tfrac{3}{4}) = 297.5$$

In this way, by switching the outputs from the data selector 8 in accordance with the lower order two bit data from the encoder 9 in order to incorporate the information of the lower order two bits in the time axis direction, the output which is the 8 bit data and also includes the information of lower order two bits can be obtained.

The average signal of the signals during the blanking interval of the digital video signal, when it is output from the data selector 8 as mentioned below, is sent to the data selector 3. Although the data selector 3 normally outputs the digital video signal from the digital signal processing circuit 2, it outputs the output from the data selector 8 during the blanking interval in accordance with the blanking plus $S_2$. Thus, the signals during the blanking interval, which have been lost in the digital signal processing circuit 2, are reproduced.

In the practical embodiment of this invention as described above, it is considered that the blanking pulse $S_2$ inputted to the gate circuit 5 is the same as that inputted to the data selector 3. However, when the inputted video signal is not synchronized with the outputted video signal, such a blanking pulse $S_2$ as synchronized with each video signal will be used. That is, the blanking pulse $S_2$ supplied to the gate circuit 5 may be different from the blanking plus $S_2'$ supplied to the data selector 3 each other.

As understood from the circuit operation mentioned above, the signal level during the blanking interval of the digital video signal output from the data selector 3 is switched between two values A and B ($=A+1$) in accordance with the value of the lower order two bits of the output from the sum circuit 6. However, when the video signal is clamped again in an analog manner in a video output stage (subsequent to the D/A converter 4), the clamping level will be at the level resulting from the integration (or time-averaging) of the signals during the blanking interval so that as described above, subtle differences smaller than the quantitation level can be represented.

Further, in accordance with this embodiment, all the circuits are constructed by digital circuits and so operated in a digital manner. Thus, the entire circuits can be easily integrated.

Figure 3:
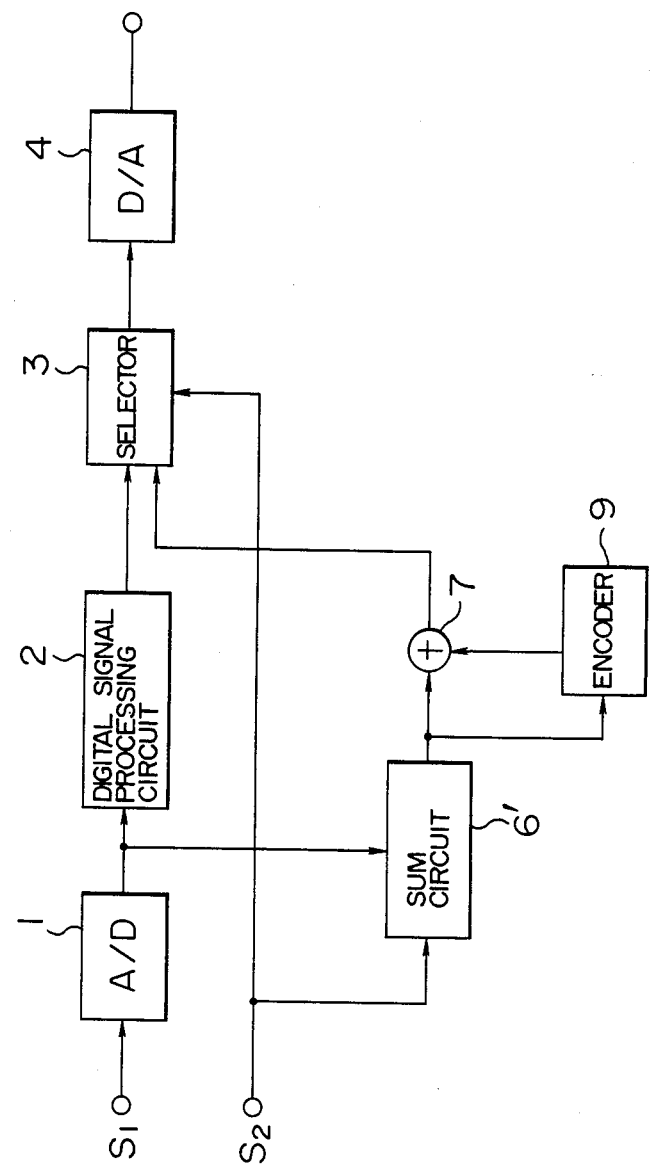
FIG. 3 is a block diagram of the digital signal processing system in accordance with another embodiment of this invention.

FIG. 3 is a block diagram of another embodiment of this invention. Like reference numerals refer to like elements in FIG. 1. Incidentally, in this embodiment, the number of bits of the data employed in the A/D converter 1, the digital signal processing circuit 2, the data selector 3 and the D/A converter 4 and the number of the data employed in the input and output of a sum circuit 6' are the same as in the embodiment of FIG. 1.

In FIG. 3, an analog video signal 5, is sent to the A/D converter 1 is and converted into a digital video signal there. This digital video signal is sent to the sum circuit 6'.

The sum circuit 6' is directly controlled by the blanking pulse $S_2$ and serves to operate only about the information during the blanking interval. Thus, the sum circuit 6' takes the sum of the information during the blanking interval and outputs signal representative of the sum each when the sum of four data is taken as in the embodiment of FIG. 1.

Then, the lower order 2 bit data of the output of the sum circuit 6' is sent to the encoder 9 while the higher order 8 bit data except the lower order 2 bit data is sent to the adder 7. The operation of the encoder 9 is the same as in the embodiment of FIG. 1. The output from the encoder 9 is directly added to the output from the sum circuit 6'. Namely, since the output from the encoder 9 is an "H" level or an "L" level is mentioned relatively to the embodiment of FIG. 1, now assuming that the "H" level is "1" and the "L" level is "0", "1" or "0" is added. In this way, the same operation as that carried out by the approximation data producing circuit 7, the data selector 8 and the encoder 9 can be carried out.

The operation subsequent to the adder 7 is entirely the same as in the embodiment of FIG. 1 and so its explanation will be omitted.

Accordingly, the signal during the blanking interval is switched between the signal A and signal B. In terms of analog expression, the level between the signals A and B can be taken, thus permitting subtle differences smaller than the quantitation level to be expressed.

Further, when the sum of $2^n$ data except 4 data is taken, for example, when the sum of 8 data is a 11 bit data when the input is a 8 bit data. Then, the lower order three bit data must be sent to the encoder 9, thereby increasing the amount of information of the lower order bits. Therefore, the entire circuit must be constructed by considering this fact.

The construction of the sum circuit 6' will be explained below. The sum circuit 6' may include, in addition to sequentially delaying information inputs to add them and hold, the following functions of:

(1) adding the information input during the blanking interval, and (2) increasing the averaging accuracy in a cyclic construction.

One example of the sum circuit 60 is shown in FIG. 4. In FIG. 4, 61 is a sequential sum circuit; 62, 65 and 67 are a latch, 63 and 66 are an adder; 64 is a selector, and 68 is a timing adjusting circuit.

In the sum circuit 60 of FIG. 4, in addition to the sequential sum circuit 61, the adders 63 and 66 connected in a closed loop, which serve as an integration element, are used to increase the output accuracy. The selector 64, which is controlled by the blanking pulse $S_2$, is used to operate only the information input during the blanking interval. Farther, the blanking pulse $S_2$ subjected to the adjustment by the timing adjusting circuit 68 is used as a clock for the final stage latch 67 to provide an information holding function.

I claim:

1. A digital blanking reproducing circuit comprising:
    an A/D converter for converting video signals externally supplied into digital video signals;
    video signal processing means for signal-processing said digital signal;
    gate means which is externally supplied with a blanking pulse representative of the blanking interval of the video signals, said gate means for outputting said digital video signals during the blanking interval thereof;
    blanking signal processing means for calculating an average value of some of said digital video signals during the blanking interval and time-divisionally outputting a plurality of digital signals in the neighborhood of said average value;
    data selector means which is supplied with the output signals from said video signal processing means and the outputs from the blanking signal processing means, said data selector means for passing the output signals from said blanking signal processing means during the blanking interval and for passing the output signals from said video signal processing means during the other period; and
    a D/A converter for converting the passed output signals into analog signals.

2. A digital blanking reproducing circuit according to claim 1, wherein said blanking signal processing means comprises:
    average value producing means for calculating an average value of some of the digital video signals supplied from said gate means during the blanking interval and outputting it;
    approximation data producing means for producing a plurality of approximation data in the neighborhood of said average value; and
    time-division output means which is supplied with said plurality of approximation data and a signal indicative of said average value, said time-division output means for time-divisionally outputting said plurality of approximation signals in a time-division ratio in accordance with said average value signal.

3. A digital blanking reproducing circuit according to claim 2, wherein said A/D converter and said D/A converter are an N (N: positive integer) bit converter, respectively; said average value producing means produces an M (M: positive integer, M>N) bit average value signal and said approximation data producing means produces N bit approximation data.

4. A digital blanking reproducing circuit according to claim 3, wherein the time-division ratio in said time-division output means is decided in accordance with the lower order (M-N) bit data of the average value signal.

* * * * *